June 28, 1966  J. P. TEMPLE ET AL  3,258,410

METHOD OF MAINTAINING A MONOMER RATIO IN CONDENSING POLYAMIDES

Original Filed Sept. 27, 1960

INVENTORS
SIDNEY J. BAUM,
DAVID K. EADS
and JOHN P. TEMPLE

BY *Stanley Sacks*

ATTORNEY.

United States Patent Office 3,258,410
Patented June 28, 1966

3,258,410
METHOD OF MAINTAINING A MONOMER RATIO IN CONDENSING POLYAMIDES
John P. Temple, Leominster, Mass., Sidney J. Baum, Encino, Calif., and David K. Eads, Levittown, Pa., assignors to Foster Grant Co., Inc., Leominster, Mass., a corporation of Delaware
Continuation of application Ser. No. 58,750, Sept. 27, 1960. This application Mar. 26, 1965, Ser. No. 446,466
3 Claims. (Cl. 203—39)

This application is a continuation of application S.N. 58,750 filed September 27, 1960, now abandoned.

This invention relates generally to a method and apparatus for processing synthetic linear polyamides and cyclic amide monomer and oligomers recovered therefrom. More specifically this invention relates to an efficient, trouble-free method and apparatus for condensing gaseous cyclic amide monomer and oligomers.

It is well known in the art that mono aminocarboxylic acids and their ester, amide and lactam derivatives may be self-condensed by conventional methods. The "nylon polymers" thereby produced contained varying amounts of extractable monomer and oligomers and may have average relative viscosities in formic acid of from 25 to 80 employing standard A.S.T.M. test D789–53T. Usually these polymers correspond to the general formula

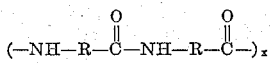

wherein R represents a hydrocarbon radical and $x$ is the number of units in the chain.

Particularly in the formation of polymers of cyclopentanone isoxime, cyclohexanone isoxime (caprolactam) and suberone isoxime, nylon-5, 6 and 7 respectively, an equilibrium between the polymeric component and the monomeric and oligomeric components of the reaction mixture is ultimately established in which the combined monomeric and oligomeric content is about 4 to 16% by weight. The monomer and oligomers in the resultant polymer form undesirable impurities which are normally extracted. The term oligomers as used herein refers to low molecular weight polymers of the monomeric material probably containing from two to ten repeating units of the structure.

Two known methods are employed to recover monomer and oligomers from the polymeric material. One method is by extraction employing boiling water and other solvents for the soluble monomer and oligomers. However, this method is costly and time consuming since two steps are involved after extraction, i.e., careful drying of the polymeric composition and recovery of the monomer from a dilute solution. The monomer amounting in some cases to about 80 to 90% by weight of the extracted material is expensive and cannot be discarded with the solvent for reason of economy.

A second method is by vacuum stripping whereby the nylon polymer is heated in a vacuum until a substantial proportion of the cyclic amide monomer and oligomers vaporize and are recovered from the polymer, such evaporation occurring at a temperature and vacuum where the polymer itself will not vaporize or be deteriorated.

It is known that the gaseous mixture of monomer and oligomers can be condensed in a conventional industrial type condenser wherein the gaseous mixture flows into the tubes of the condenser and condenses. The condensed monomer and oligomer mixture is collected and partially separated by permitting the denser oligomers to settle to the bottom of the liquid mixture. If desired, further purification of the supernatant liquid is performed employing a conventional distillation procedure. However, one major problem involves cooling the condenser tubes to a relatively low temperature in order to condense the monomer to a liquid state. At such temperature a high percentage of the oligomers change to a solid state and gradually clog the condenser tubes. An example of tube clogging is illustrated in a nylon-6 process wherein polycaprolactam is vacuum stripped and a flow rate of 5 to 50 lbs./hr. of recovered gaseous caprolactam monomer and oligomers is obtained. Utilizing a multi-tube "knock-back" type condenser in which the diameter of each tube is approximately 1 inch and the length of each tube is approximately 33 inches, a shut down of operations is required after approximately 60 days due to oligomer build-up and clogging on the condenser tubes. Thus, in such a system, periodic shut down of operation to clean clogged tubes is required with attendant loss in production, and expense in subsequent start-up operations.

Because of the foregoing difficulty, many varieties of mechanical scraping devices which would operate while the condenser is in use, have been devised. However, these devices are relatively expensive, both in original cost and operation, and create mechanical problems and complications in the condenser.

We have now found most unexpectedly that by introducing an excess of monomer into the condenser the oligomers can be retained in solution or suspension by the monomer and prevented from forming clogging deposits. The application of this expedient is based on the fact that the solidified oligomers have only a limited solubility in the liquefied monomer that normally accompanies it and which is condensed in the condenser tubes. More specifically, by utilizing a sufficiently high concentration of monomer in the gaseous mixture of monomer and oligomers, oligomers will be carried down out of the condenser by the condensing monomer liquid before they can solidify on the tube walls. In addition, we have devised a unique and efficient system for supplying additional gaseous monomer to the extracted monomer and oligomers.

Our invention is illustrated and more fully disclosed in the accompanying illustrations, which are not to be considered as limiting and in which.

Figure 1:
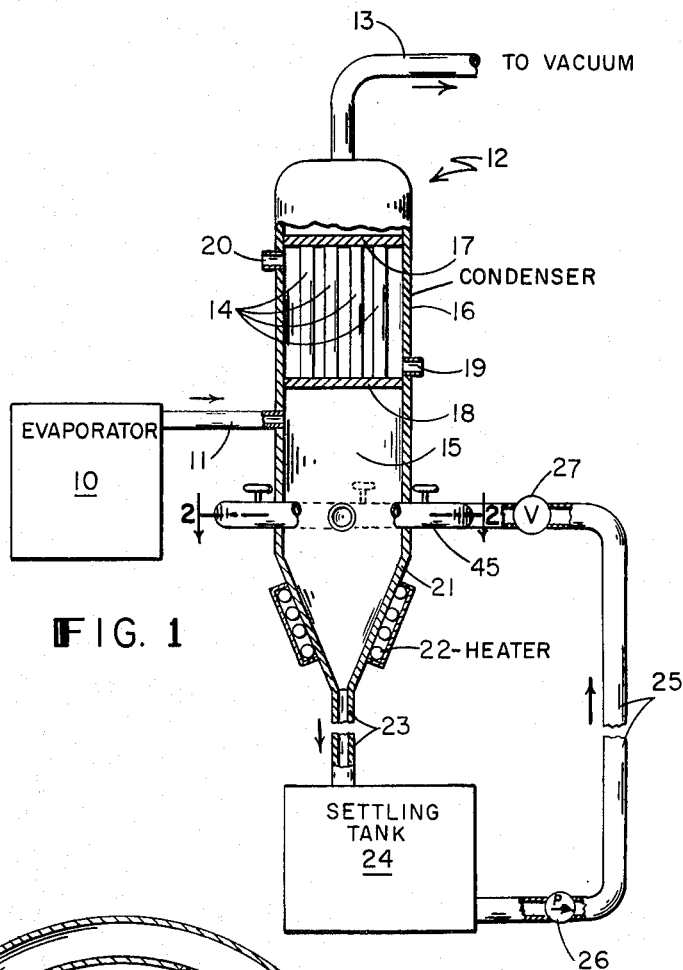
FIGURE 1 is a semi-diagrammatic front view embodying the invention with the condenser shown in section.
Figure 2:
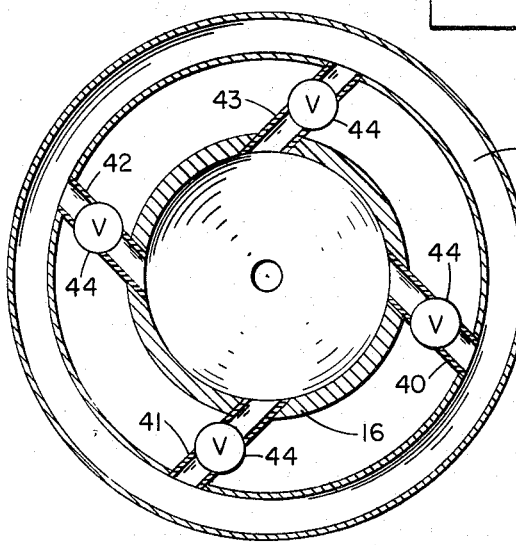
FIGURE 2 is a top sectional view taken along line 2—2 of FIGURE 1.

Referring to FIGURE 1, an evaporator 10, which may be a conventional evaporator, preferably a film evaporator, is heated to a temperature at which nylon polymer is substantially devolatilized. The recovered gaseous mixture of monomer and oligomers is drawn off through pipe or passageway 11 towards the "knock-back" condenser 12. A plurality of passageways may be employed.

Enclosed chamber or condenser 12 may be of any well known type and size depending on the volume of gases to be condensed and as illustrated may comprise a "knock-back" vertical tube type comprising at least one vacuum port or passageway 13 located at the top or on the opposite end of the condenser tubes 14 from the gas filled chamber 15. A vertical tube section comprising condensing tubes 14 held by plates 17 and 18 is located beneath the vacuum opening. These tubes are open at both ends and are cooled by suitable cooling media continuously circulated by means of ports 19 and 20. Immediately below tube support plate 18 is a chamber or substantially cylindrical portion 15 having a generally conical or funnel shaped base 21. While the shape of the chamber 15 is not critical, best results are achieved with a conical shaped base as disclosed. A heater is positioned along the outside of the funnel shaped base 21. The heater may comprise hot water passages or any other conventional heating means may be employed. Re-entry passages, 40, 41, 42, and 43 are positioned on wall 16 and open into chamber 15. The lower portion of chamber 15 opens into a barometric leg, or passageway 23, which in turn leads to a conventional settling chamber and pit tank shown diagramatically at 24. Passageway or pipe 25 having pump 26 and gate valve 27 therein, connects the settling chamber with the ring shaped passage 45. The entire condenser from top passageway 13 to the bottom of conical portion 21 preferably has an external insulation (not shown) to maintain temperature control of the system. Although only base 21 is shown to be heated, the entire chamber 15 may be heated if desired.

In actual operation, the nylon polymer containing extractable or recoverable material is heated in evaporator 10 to a point where the monomer and oligomers are vaporized. A vacuum is maintained in the system by means of the top condenser passageway or port 13. The extracted monomer and oligomers flow along passage 11 and from there into condenser tubes 14 where condensation of the monomer in the liquid form and the oligomers in the liquid and solid form take place. As the gaseous mixture condenses in tubes 14 the monomer carrying dissolved or suspended oligomers falls in a downward direction into (and along the walls of) chamber 15. The monomer liquid and the oligomers continue to fall through chamber 15 into funnel portion 21. A portion of the falling monomer liquid is vaporized at the walls of funnel portion 21 and is recycled into condenser tubes 14 thus increasing the ratio of monomer to oligomers within the condenser tubes 14. The remaining portion of the liquefied monomer and oligomers falls along tube 23 into settling chamber and pit tank 24. Within the settling chamber and pit tank a substantial proportion of the denser and insoluble oligomers settle at the bottom of the tank and the supernatant substantially pure liquid monomer is pumped through passageways 25 by means of conventional fluid pump 26 into ring shaped passageway 45.

The substantially pure monomer from ring shaped passage 45 enters heated chamber 15 through passageways 40, 41, 42, and 43. Each of these passageways are opened by valves 44 at successive intervals of approximately 1 hour. It is preferred that the passageways 40, 41, 42 and 43 be positioned to enter chamber 15 substantially tangentially to wall 16, however, if desired they may enter at other angles relative to wall 16. The entrance of the monomer tends to create a swirling action within the funnel shaped section 21 of the condenser and thus spread the monomer on as great a surface area as possible. The number of monomer entrance passageways and the time interval noted may be varied if desired. A substantial proportion of the recycled substantially pure monomer is vaporized within the conical section 21 by the action of heater 22 and rises and enters condensed tubes 14, further raising the monomer to oligomer ratio within the condenser tubes 14. The walls of chamber 15, if they are heated, and the funnel shaped walls of conical section 21 are essentially film type evaporators.

If desired, a monomer boiler or vaporizer (not shown) may be employed in passageway 25. In such case the substantially pure recycled monomer enters heated chamber or portion 15 in gaseous form and immediately rises to passageways 14. The use of a conventional film evaporator is preferred when this expedient is employed. It should be noted that the placement of the film evaporator, i.e., conical portion 21 and the upper wall of chamber 15 if heated, at the lower portion of condenser 12 is the preferred embodiment of this invention. When liquid monomer is employed, said liquid will tend to dislodge oligomers which may collect on funnel portion 21. However, if gaseous monomer is brought into chamber 15, problems of gas flow within the chamber 15 may arise. Since a larger volume of material must be brought into chamber 15 when the monomer is in gaseous, rather than liquid, form undesirable gas flow problems may result due to high velocity flow. It should be noted that any source of monomer may be employed, i.e., monomer other than that collected in settling chamber and pit tank 24. The added monomer is preferably substantially pure. However, even if a highly impure monomer and oligomer mixture is employed, only the monomer will be vaporized in portion 21 with the impurities being carried down drain 23.

The particular dimensions, times, rates of flow, temperatures, and vacuum employed in this process will vary depending upon the nylon polymer being treated, and the volume of materials to be vaporized and recovered. When the system is used with polycaprolactam the following values may be employed. The polymer is heated in chamber evaporator 10 and the extracted gaseous mixture of caprolactam and oligomers thereof move through passageway 11 towards condenser 12 at a rate from the evaporator to the condenser of 5 to 50 lbs./hr. The condenser is a multi-tube vertical knock-back type, each tube having a diameter of one inch and a length of 33 inches. Cooling water is passed through the tube section of the condenser at 62–68° C., and a temperature of approximately 69° C. is maintained on the inside tube walls. The inside tube wall temperature is maintained at approximately 69° C. in order to condense the monomer just above its melting point. The system is operated within a range of 0.5 to 2.0 millimeters of mercury vacuum with 1.5 millimeters preferred. The vaporized gaseous mixture of caprolactam and oligomers in tube 11 is drawn upward into tubes 14 of the condenser wherein caprolactam is condensed to liquid and the oligomers are condensed to both liquid and solids.

Additional caprolactam monomer is recycled from the settling chamber and pit tank 24 into chamber 15. The recycled monomer vaporizes and rises to tubes 14 raising the monomer to oligomer ratio therein. A portion of the condensed caprolactam monomer falling through chamber 15 is vaporized on conical bottom 21 and also rises to tubes 14 further raising the monomer to oligomer ratio therein. The monomer to oligomer ratio in tubes 14 is raised from approximately 5.5 to 1 to approximately 40 to 1. At this level the oligomers formed will be dissolved in and/or washed down the tube walls by the downwardly flowing condensing monomer liquid. In this system recycled monomer, i.e., caprolactam is circulated to the conical bottom 21 from settling chamber and pit tank 24 at approximately 20 gals. per minute and at a temperature at from 80 to 95° C., preferably 85 to 90° C. This temperature is maintained by heater 22 acting around the conical portion 21.

In contrast to previously used systems, our method can be employed continuously and for extremely long periods without any substantial clogging of the condenser tubes.

Many changes and alterations may be made without departing from the spirit and scope of this invention which is set forth in the appended claims which are to be construed as broadly as possible in view of the prior art.

We claim:

1. A method of condensing a vaporous mixture of monomer and oligomers of synthetic polyamides, the ratio of monomer to oligomer in said mixture being about 5.5 to 1, comprising introducing said mixture into substantially vertically extending cooled passageways of a condenser thereby cooling said vaporous mixture to form liquid monomer and liquid and solid oligomers, heating said condensed mixture to vaporize a portion of the monomer therein, reintroducing said vaporized monomer into said vertically extending passageways simultaneously with said mixture in an amount sufficient to increase the monomer to oligomer ratio in said mixture to about 40 to 1, said monomer content thereby being sufficient to raise the concentration of said monomer in said mixture to a point where oligomers formed in said condenser are carried down out of the condenser by condensing monomer liquid before said oligomer can solidify in the vertically extending cool passageways and whereby said solid oligomer is substantially entrained in the liquid monomer in said vertically extending passageways.

2. A method of condensing a vaporous mixture of monomer and oligomers of synthetic polyamides, the ratio of monomer to oligomer in said mixture being about 5.5 to 1, comprising introducing said mixture into substantially vertically extending cooled passageways of a condenser at a rate of 5 to 50 pounds per hour thereby cooling said vaporous mixture to form liquid monomer and liquid and solid oligomers, heating said condensed mixture to vaporize a portion of the monomer therein reintroducing said vaporized monomer into said vertically extending passageways simultaneously with said mixture in an amount sufficient to increase the monomer to oligomer ratio in said mixture to at least about 40 to 1, said monomer content thereby being sufficient to raise the concentration of said monomer in said mixture to a point where oligomers formed in said condenser are carried down out of the condenser by condensing monomer liquid before said oligomers can solidify in the vertically extending cool passageways and whereby said solid oligomer is substantially entrained in the liquid monomer in said vertically extending passageways.

3. The method of condensing a vaporous mixture of monomer and oligomers of synthetic polyamides; the ratio of monomer to oligomer in said mixture being substantially less than 40 to 1; comprising condensing said mixture in a vertical cooled condenser; recycling previously condensed monomer and introducing it into said mixture as it passes into said vertical cooled condenser in an amount sufficient to increase the monomer to oligomer ratio of said mixture to at least about 40 to 1, whereby the oligomers in said condenser are dissolved or suspended in the monomer and are carried down and out of the condenser by said monomer before the oligomers can solidfy in the condenser.

References Cited by the Examiner
UNITED STATES PATENTS

| | | | |
|---|---|---|---|
| 2,460,117 | 1/1949 | Beckel et al. | 202—176 |
| 2,862,021 | 11/1958 | Bille et al. | 260—475 X |
| 2,925,367 | 2/1960 | Soelberg | 202—176 |
| 2,952,675 | 9/1960 | Bolle | 260—239.3 |
| 3,177,181 | 4/1965 | Baum et al. | 260—78 X |

NORMAN YUDKOFF, *Primary Examiner.*

F. E. DRUMMOND, *Assistant Examiner.*